United States Patent
Feng et al.

(10) Patent No.: US 7,352,942 B2
(45) Date of Patent: Apr. 1, 2008

(54) OPTICAL FIELD CONCENTRATOR USING MULTIPLE LOW-INDEX NANO-LAYER CONFIGURATION FOR CMOS COMPATIBLE LASER DEVICES

(75) Inventors: Ning-Ning Feng, Somerville, MA (US); Jurgen Michel, Arlington, MA (US); Lionel C. Kimerling, Concord, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 11/410,228

(22) Filed: Apr. 24, 2006

(65) Prior Publication Data
US 2007/0248308 A1 Oct. 25, 2007

(51) Int. Cl.
G02B 6/10 (2006.01)
H01L 21/00 (2006.01)

(52) U.S. Cl. .............. 385/130; 385/129; 385/131; 438/31

(58) Field of Classification Search ........ 385/123–132; 438/31–32
See application file for complete search history.

(56) References Cited

U.S. PATENT DOCUMENTS

| | | | |
|---|---|---|---|
| 5,515,461 A * | 5/1996 | Deri et al. ................. | 385/30 |
| 2005/0201439 A1 * | 9/2005 | Horie ....................... | 372/43.01 |
| 2005/0276557 A1 * | 12/2005 | Bour et al. ................. | 385/131 |
| 2006/0088265 A1 * | 4/2006 | Akiyama et al. ........... | 385/129 |
| 2006/0228074 A1 | 10/2006 | Lipson et al. | |

OTHER PUBLICATIONS

Almeida et al., "Guiding and confining light in void nanostructure" Optics Letters, June 1, 2004, vol. 29, No. 11, pp. 1209-1211.
Xu et al., "Experimental demonstration of guiding and confining light in nanometer-size low-refractive-index material" Optics Letters, Jul. 15, 2004 vol. 29, No. 14, pp. 1626-1628.
Barrios, "Electrically driven silicon resonant light emitting device based on slot-waveguide" Optics Express, Dec. 12, 2005, vol. 13, No. 25, pp. 10092-10101.
Baehr-Jones et al., "High-Q optical resonators in silicon-on-insulator-based slot waveguides" Applied Physics Letters, vol. 86, 2005,pp. 0181101-1-0181101-3.
Xu et al., "Experimental demonstration of guiding and confining light in nanometer-size low-refractive-index material" Optics vol. 29, No. 14, Jul. 15, 2004, XP-002417872, pp. 1626-1628.

(Continued)

*Primary Examiner*—Frank G. Font
*Assistant Examiner*—Charlie Peng
(74) *Attorney, Agent, or Firm*—Gauthier & Connors LLP

(57) ABSTRACT

An optical field concentrator includes a plurality of waveguide layers comprising high index materials having a first defined thickness. At least one nano-layer structure is positioned between said waveguide layers. The at least one nano-layer structure comprises low index materials having a second defined thickness that is smaller than the first defined thickness. A plurality of cladding layers are positioned between the waveguide layers and the at least one nano-layer structure. The cladding layers have a third defined thickness that is larger than the first defined thickness.

21 Claims, 11 Drawing Sheets

OTHER PUBLICATIONS

Xu et al., "Silicon void nano-waveguides for guiding and confining light" XP-002417875, pp. 1-3.

Almeida et al., "Guiding and confining light in void nanostructure" Optics Letters, vol. 29, No. 11, Optics Letters, 2004 Optical Society of America, pp. 1209-1211.

Galli et al., "Direct evidence of light confinement and emission enhancement in active silicon-on-insulator slot waveguides" Applied Physics Letters, 89, 241114, 2006 American Institute of Physics, pp. 241114-1-241114-3.

Almeida et al., "Light Guiding in Low Index Materials using High-Index-Contrast Waveguides" Mat. Res. Soc. Symp. proc. vol. 797, XP-002417873, pp. 6.10.1-6.10.6.

Soref et al., "Silicon antiresonant reflecting optical waveguides" 2412 Optics Letters, Jul. 15, 1990, No. 14, pp. 792-794.

Feng et al., "Optical Field Concentration in Low-Index Waveguides" IEEE Journal of Quantum Electronics, vol. 42, No. 9, XP 002451836, Sep. 2006, pp. 885-890.

* cited by examiner

OPTICAL FIELD CONCENTRATOR USING MULTIPLE LOW-INDEX NANO-LAYER CONFIGURATION FOR CMOS COMPATIBLE LASER DEVICES

BACKGROUND OF THE INVENTION

The invention relates to the field of optical field concentrator, and in particular to a highly efficient optical field concentrator that is capable of confining optical field in nanometer-thin low-index media with very high optical confinement factor.

Silicon based photonic integration is a promising technology that can potentially integrate optical and electronic devices on one single silicon wafer through CMOS technology. One of the key components is the silicon-based electrically-pumped laser that can emit at telecommunication wavelength. Among the different silicon based gain materials developed so far, silicon nanostructures and rare earth doping of silicon in $SiO_2$ have dominated scientific efforts towards the goal of achieving practical silicon lasers. However, directly using these oxide materials as laser core layers faces both electronic and optical difficulties: on one hand, making electrical carrier injection through the non-conductive thick oxide is very difficult; on the other hand, large optical confinement in low-index thin gain materials is also hard to achieve with conventional approaches. For the first issue, researchers have recently demonstrated that for the oxide thickness in the range of 5-10 nm, the efficient carrier injection can be realized by the field effect tunneling injection approach. In order to achieve high external quantum efficiency of the laser, confining and guiding light in such low-index nanometer-sized structures with very high confinement factor, hence, becomes a key technology for CMOS compatible light emitting devices.

Strong optical field concentration with very high optical confinement and power density in very small volume is also of great importance for the other guided wave optoelectronic devices, such as optical microcavities, switches, modulators, optical sensors and other applications requiring high field confinement in low-index medium. It increases the degree of control of light-matter interaction, allowing both enhancement and inhibition. With the development of photonic technology, the device size is approaching the nanometer range. It needs a new confining mechanism that is able to break the diffraction limit of the light and still able to guide and confine light.

Conventional optical field confining and concentrating are based on optical waveguides made of a high-index core surrounded by low-index claddings. For the guided modes with steady spatial pattern to exist in the waveguide, it requires total internal reflections (TIR) at the boundaries to ensure that the optical field mainly concentrates and propagates in the core region. Therefore, low-index guiding and confining are prohibited in conventional waveguides. In some other circumstances, such as in the photonic bandgap (PBG) structures and antiresonant reflecting optical waveguides (ARROWs), by utilizing the external reflection induced by the multiple-dielectric-layer interferences, light can be confined and guided in the low-index core.

However, because the external reflection is realized by interferences, the performances of PBG or ARROW-type waveguides are very sensitive to the physical parameters, such as layer thicknesses (or periods) and indices, as well as the operating wavelength. Furthermore, to confine light inside the core region, the resonant condition requires the core layer thickness to be in the order of half wavelength. It appears that the nanometer size low-index guiding is not possible by ARROW-type waveguides.

A slot waveguide has demonstrated the capability of guiding and confining light in low-index media in the nanometer size range. The structure consists of a thin low-index ($n_l$) slot embedded between two rectangular high-index ($n_H$) regions. Due to the large index contrast at interfaces, the normal electric field undergoes a large discontinuity, which results in a field enhancement in the low-index region with a ratio of $n_H^2/n_l^2$. A confinement factor about 30% has been demonstrated with a 50 nm wide Si—$SiO_2$ slot configuration. However, in terms of the field concentration, measured by the normalized power density, this structure only provides about 20 $\mu m^{-2}$, which is about two times larger than the value of an optimal conventional silicon-on-insulator (SOI) waveguide.

This small enhancement is mainly due to the relatively large width of the slot. Further increasing the slot width will saturate the confinement factor and result in a further decrease of the field concentration. On the other hand, decreasing the slot width can increase the field concentration. However, it also decreases the confinement factor drastically. About half of the confinement will be lost due to the slot thickness decreasing from 50 nm to 5 nm. This confinement reduction will eventually compromise the power density inside the slot region.

SUMMARY OF THE INVENTION

According to one aspect of the invention, there is provided an optical field concentrator. The optical field concentrator includes a plurality of waveguide layers comprise high index materials having a first defined thickness. At least one nano-layer structure is positioned between said waveguide layers. The at least one nano-layer structure comprises low index materials having a second defined thickness that is smaller than said first defined thickness. A plurality of cladding layers are positioned between the waveguide layers and the at least one nano-layer structure. The cladding layers have a third defined thickness that is larger than the first defined thickness.

According to another aspect of the invention, there is provided a waveguide structure. The waveguide structure includes a plurality of waveguide layers comprise high index materials having a first defined thickness. At least one nano-layer structure is positioned between said waveguide layers. The at least one nano-layer structure comprises low index materials having a second defined thickness that is smaller than said first defined thickness. A plurality of cladding layers are positioned between the waveguide layers and the at least one nano-layer structure. The cladding layers have a third defined thickness that is larger than the first defined thickness.

According to another aspect of the invention, there is provided a method of forming an optical field concentrator. The method includes forming a plurality of waveguide layers comprise high index materials having a first defined thickness. At least one nano-layer structure is positioned between said waveguide layers. The at least one nano-layer structure comprises low index materials having a second defined thickness that is smaller than said first defined thickness. Also, the method includes forming a plurality of cladding layers positioned between the waveguide layers and the at least one nano-layer structure. The cladding layers have a third defined thickness that is larger than the first defined thickness.

DETAILED DESCRIPTION OF THE INVENTION

The invention presents a new optical field concentrator structure that is able to concentrate the optical field in nanometer-thin low-index layers with very high optical mode confinement and power density. The structure consists of multiple low-index nano-layers embedded in a high-index silicon waveguides. Instead of a single vertical slot structure in the original design, it is proposed to use multiple horizontal nano-layers with a vertically stacked configuration. There are two reasons for this arrangement. Firstly, the new structure can improve fabrication tolerances since the vertical thickness is much easier to control than the horizontal widths. With the state-of-the art fabrication technology, the layer thicknesses can be precisely controlled to the nanometer range with minimized surface roughness. Secondly, the horizontal nano-layer structures exhibit much better bending characteristics than vertical slots.

The inventive structure can be viewed as a result of breaking a thick dielectric layer into many thin nano-layers. Although the confinement in each thin layer decreases, we have shown that, by careful design optimization, the total confinement of all layers can still be maintained or even increased compared with the original thick layer structure. As a result, the field concentration or power density increases. A confinement factor about 42% with a normalized power density about 80 $\mu m^{-2}$ can be achieved with a 4-layer 5 nm thin nano-layer structure. Both parameters are 10%-20% larger than those of a single 20 nm thick layer structure and more than one order of magnitude larger than those of the conventional SOI waveguides within the same dimensions.

Figure 1:
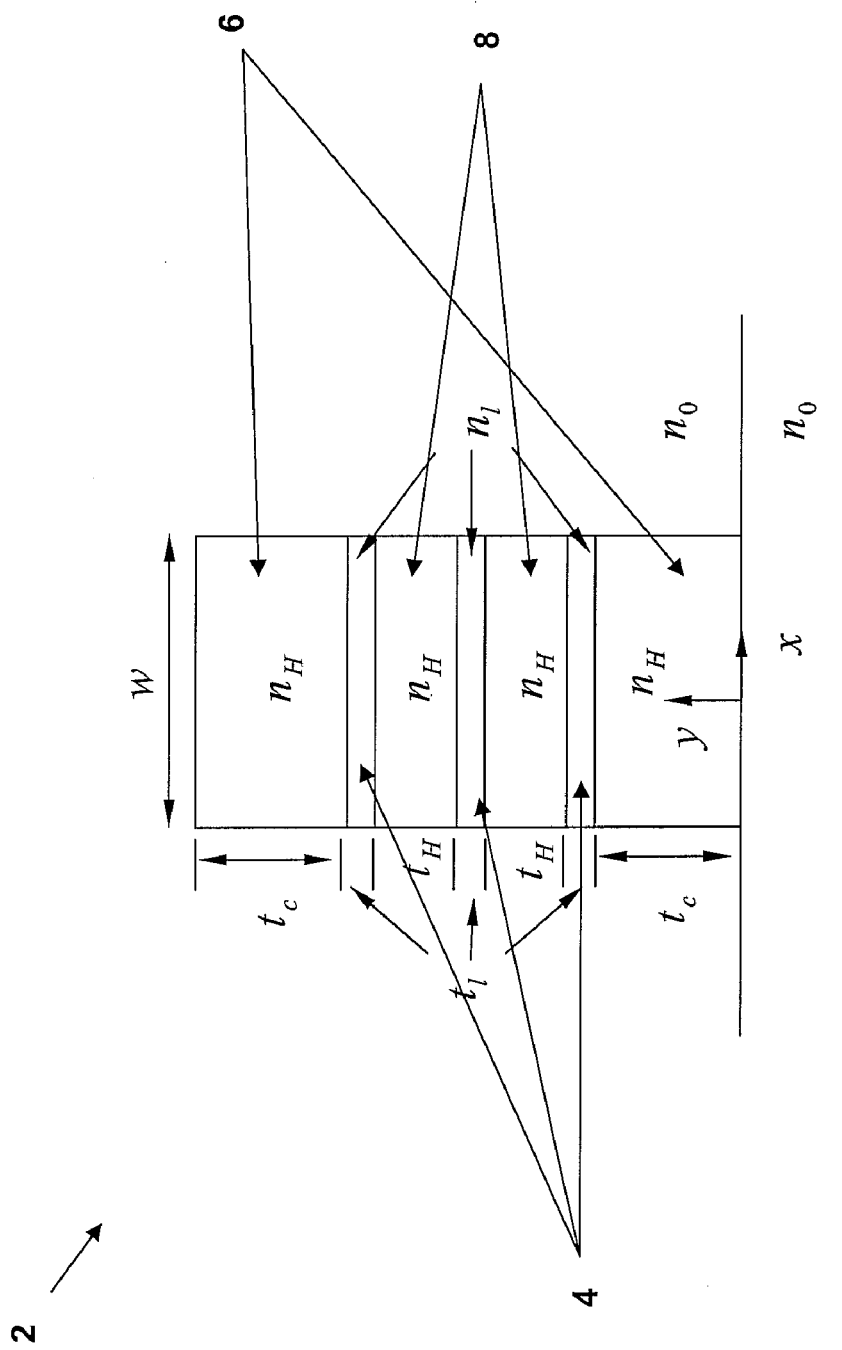
FIG. 1 is a schematic diagram of the multiple nano-layer optical field concentrator structure.

FIG. 1 is a schematic diagram of the inventive multilayered optical field concentrator or waveguide structure 2. The structure 2 includes multiple layers of low-index ($n_l$) nanometer-thin layers 4 sandwiched by high-index ($n_H$) silicon regions comprising cladding layers 6 and waveguide layers 8. The thicknesses for the silicon cladding layers 6, nanolayers 4, and waveguide silicon layers 8 are represented by $t_c$, $t_l$ and $t_H$, respectively. The refractive index for the low-index nano-layer regions 4 is set to be $n_l$=1.5, which is slightly larger than that of the $SiO_2$ considering that the confining layers may have larger refractive index. And the refractive index for the high-index silicon regions 6 and 8 is set to be $n_H$=3.5. The waveguide 2 is surrounded by low-index $SiO_2$ material with a refractive index $n_o$=1.46. The waveguide 2 width is w=250 nm to ensure single mode design.

Due to the existence of multiple high-index-contrast discontinuities in the proposed structure, full-vectorial finite-difference mode solvers are employed to simulate the optical modes of the structure. Because of the large discontinuity of refractive indices at silicon-nanolayer interfaces, the normal electric field $E_y$ component (major component for quasi-TM mode) has to be discontinuous to satisfy the continuity condition of the electric flux density D, which is given by D=nE. The total field enhancement at the boundary in the low-index region is given by the ratio of $n_H^2/n_l^2$, which can be very large for a high-index-contrast material system, such as silicon-$SiO_2$ system. Therefore, this structure is capable of realizing a high confinement factor for a quasi-TM mode.

Figure 2:
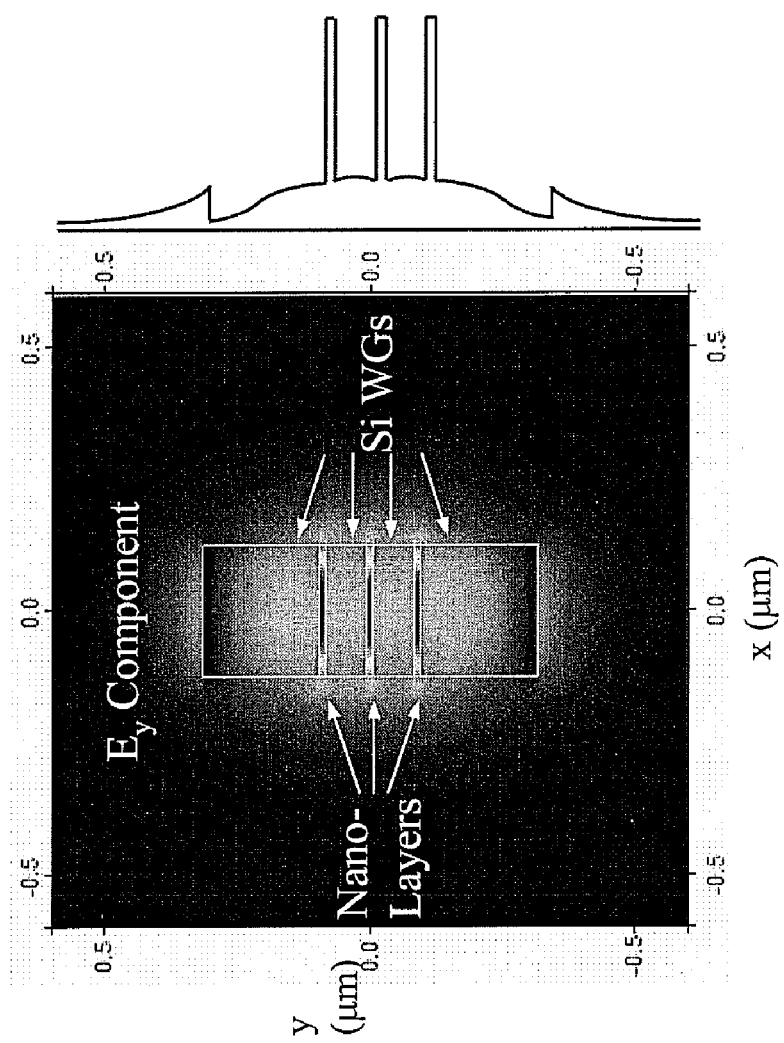
FIG. 2 is a $E_y$ field distribution of the quasi-TM mode of a 3-layer 10 nm thin nano-layer waveguide.

In FIG. 2, the $E_y$ field distribution of the quasi-TM mode of a 3-layer 10 nm thin nano-layer waveguide is shown. The thicknesses for the cladding and waveguide silicon layers are $t_c$=200 nm and $t_H$=80 nm, respectively. About 5 times field enhancement can be obtained at the boundaries in the nano-layer regions by this structure. Since the layer thickness is much smaller than the field decay distance in this region, the field can remain high and almost constant across the entire nano-layer region as shown in FIG. 2. It can be seen that although decreasing the nano-layer area will lead to the reduction of the confinement factor of each layer, the total confinement of all layers is expected to be higher than that of the thicker layer with equivalent 30 nm thickness due to the much flatter field distribution inside the three thin nano-layers.

The optical confinement factor Γ is defined as the fraction of power confined and guided in the nano-layer regions:

$$\Gamma = \frac{\sum_{m=1}^{M} \int_{nano-layer} \text{Re}(E \times H^*) \cdot \hat{z} dx dy}{\int_{total} \text{Re}(E \times H^*) \cdot \hat{z} dx dy} \qquad \text{Eq. 1}$$

where M denotes the nano-layer number, E and H are the electric and magnetic field vectors. The integrals are calculated inside the nano-layer and the entire cross-section regions.

Figure 3B:
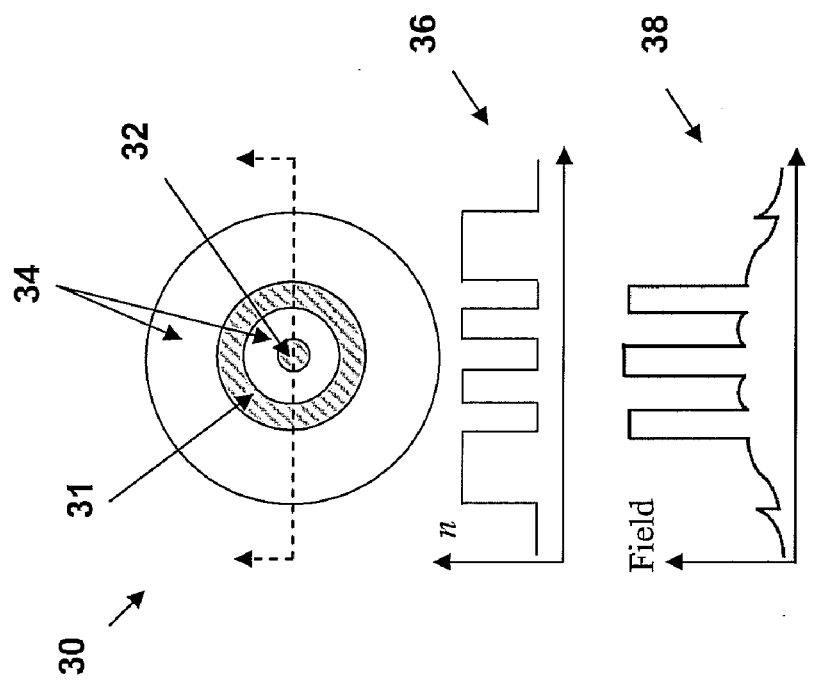
FIGS. 3A-3B are schematic diagrams and graphs demonstrating the properties two circular structures formed in accordance with the invention having low and high index cores.
Figure 3A:
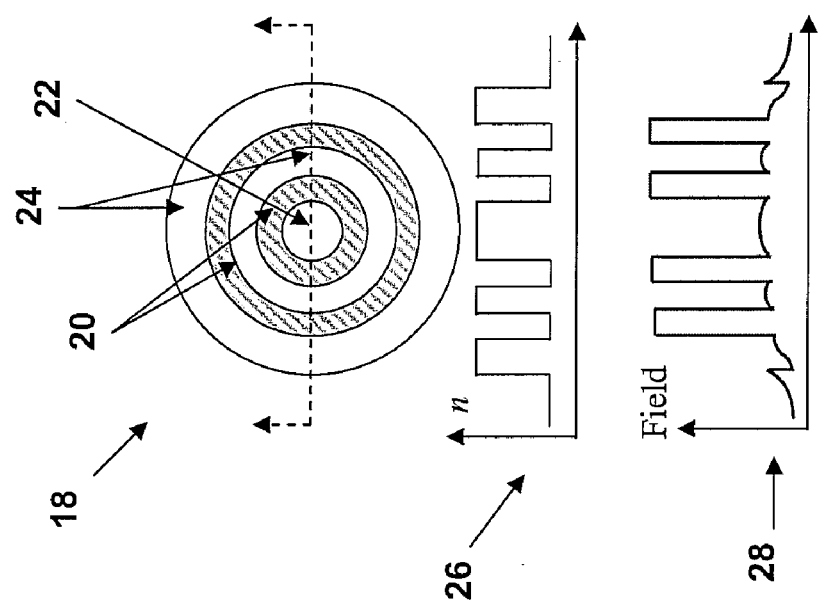

The same idea may apply to circular structures, such as an optical fiber with multiple low-index co-centered rings. In FIGS. 3A-3B, they show the schematics of the cross-sections of the cores 22, 32 of two possible fiber structures 18, 30: one with high index core 22 shown in FIG. 3A and the other with low index core 32 shown in FIG. 3B. The areas 20 and 31 are the low index media and areas 24 and 34 are the high index media. Note graphs 26, 36 illustrate the index values associated with the circular polarized light propagating in the fibers 18, 30, high optical field concentration will be observed in the low-index ring areas similar to the layered structures in rectangular coordinate system, as shown in graphs 28, 40. These structures 18, 30 are expected to have many applications in fiber-based optical devices.

Figure 4:
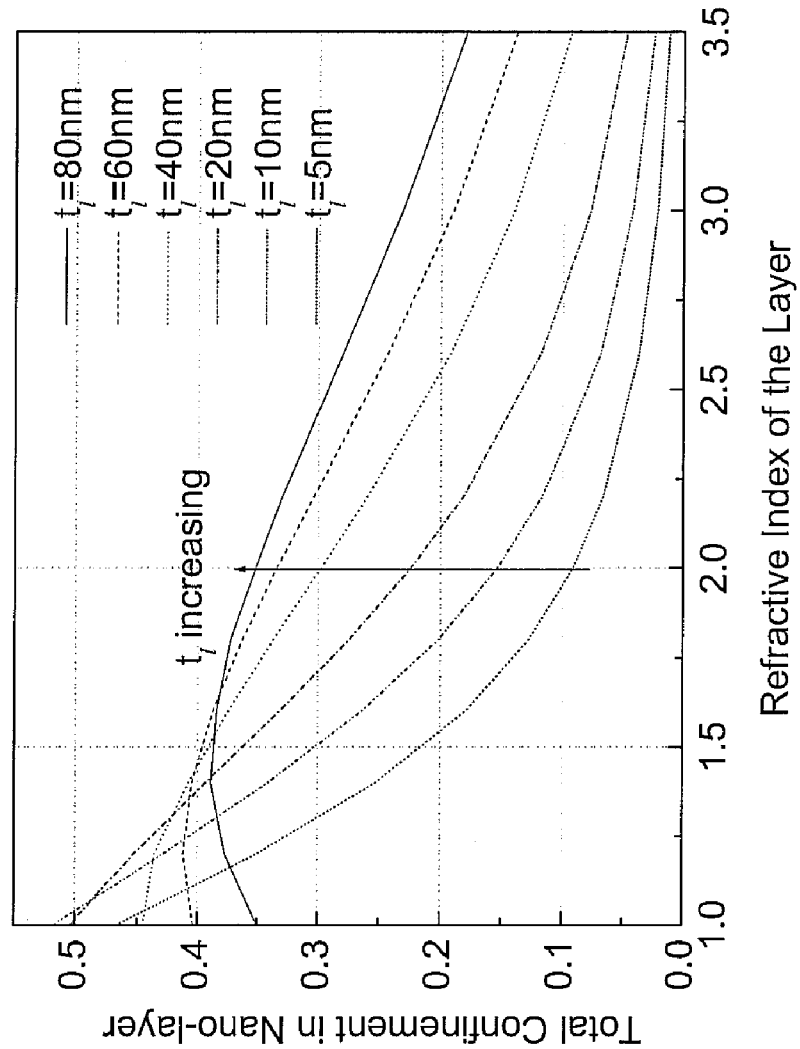
FIG. 4 is graph demonstrating the confinement factor inside the nano-layer region of a single layer structure versus the refractive index of the layer.

The effect of the refractive index of the nano-layer to the optical confinement is first studied. The confinement factor inside the nano-layer region for a single layer structure has been simulated and shown in FIG. 4 as a function of refractive index of the layer for different layer thicknesses. It is observed that with the increase of the refractive index of the layer, the confinement factor tends to decrease for most of the refractive index range. The thinner the layer thickness is, the faster the confinement decreases. It appears that the thinner layer structures favor the lower index media more and vice versa. It matches the requirement of the material selection. For the refractive index one can choose in the simulation ($n_l$=1.5), the confinement factor shows more dependence on the thinner layer thickness.

The slight drop in the large thickness range is the result of the uneven field distribution inside the nano-layers. Compared with the normal SOI waveguides (refractive index $n_H$=3.5), 10-20 times enhancement of the confinement has been achieved just by this single nano-layer configuration for all layer thickness cases.

Figures 5A, 5B:
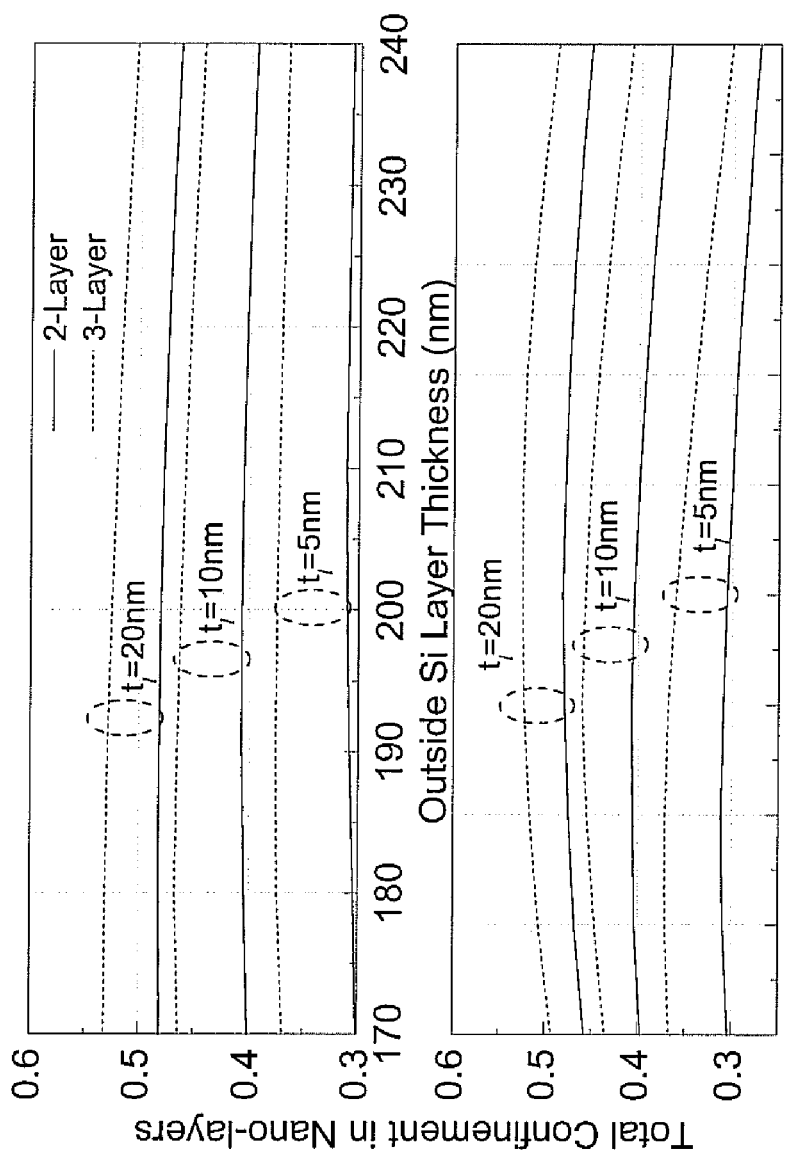
FIGS. 5A-5B are graphs demonstrating total confinement as functions of the cladding and waveguide silicon layer thicknesses.

A design optimization was carried out for achieving the highest confinement factor of the proposed multiple nano-layer structure. FIGS. 5A-5B show the total confinement inside the nano-layers as functions of the cladding and waveguide silicon layer thicknesses for 2- and 3-layer nano-layer structures with three different layer thicknesses. The effect of the outside silicon cladding layer thickness $t_c$ is almost negligible as shown in FIG. 5A, especially for thin layer structures. On the other hand, the waveguide performance is more sensitive to the thickness of waveguide silicon layers, as shown in FIG. 5B. This can be explained by the fact that the field is more concentrated in the central areas than in the outside cladding areas.

The optimal thicknesses of the waveguide silicon layers can be obtained by finding the highest confinement factors in the figure. Furthermore, the waveguide thickness appears to have more effect on the thinner layer structures. For different layer numbers, the optimal values of the thickness are almost identical. According to the simulation results, the optimal values for the waveguide silicon thicknesses are 40 nm, 80 nm and 110 nm for 5 nm, 10 nm, and 20 nm thick layers, respectively.

Figure 6:
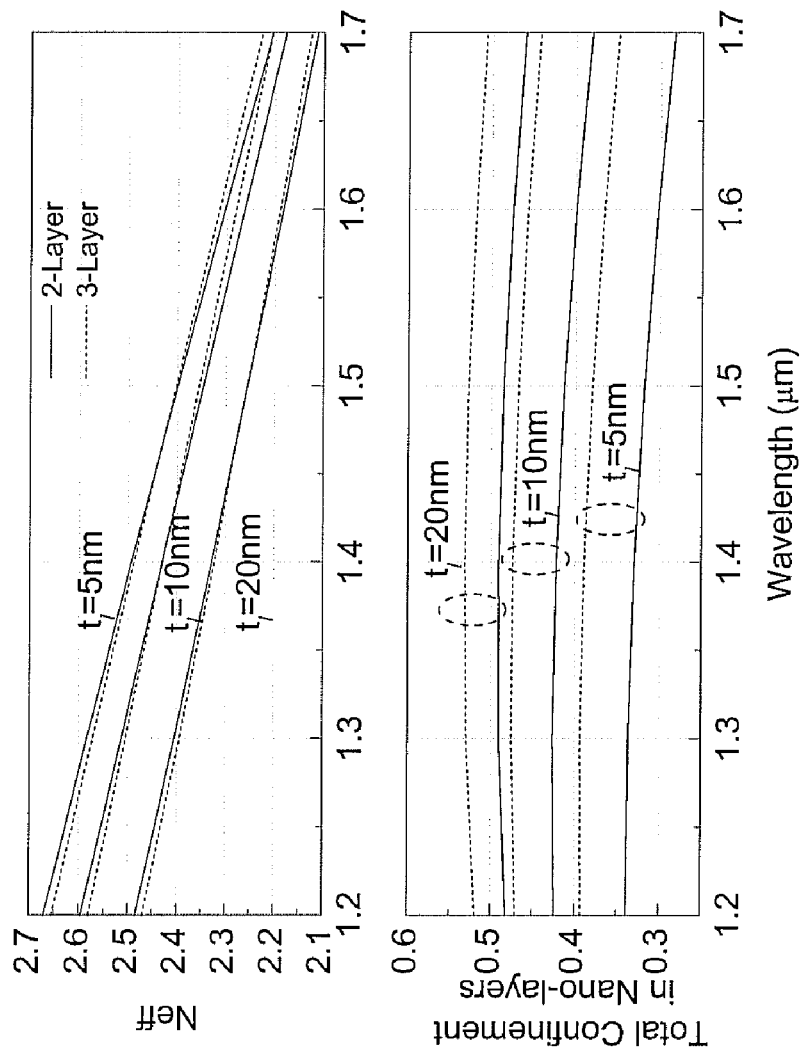
FIG. 6 is a graph demonstrating the wavelength dependence of the total confinement and effective index of the multiple nano-layer structure.

By simulating those optimal structures, one is able to obtain the optical properties of several structures. Firstly, the wavelength dependence of the total confinement and effective index are studied and the results are shown in FIG. 6. Very little wavelength dependence of the confinement factor can be observed from in the entire 500 nm wavelength range. Also, the effective index is not very sensitive to the layer number. They are almost identical for the 2 and 3 layer cases.

Figure 7:
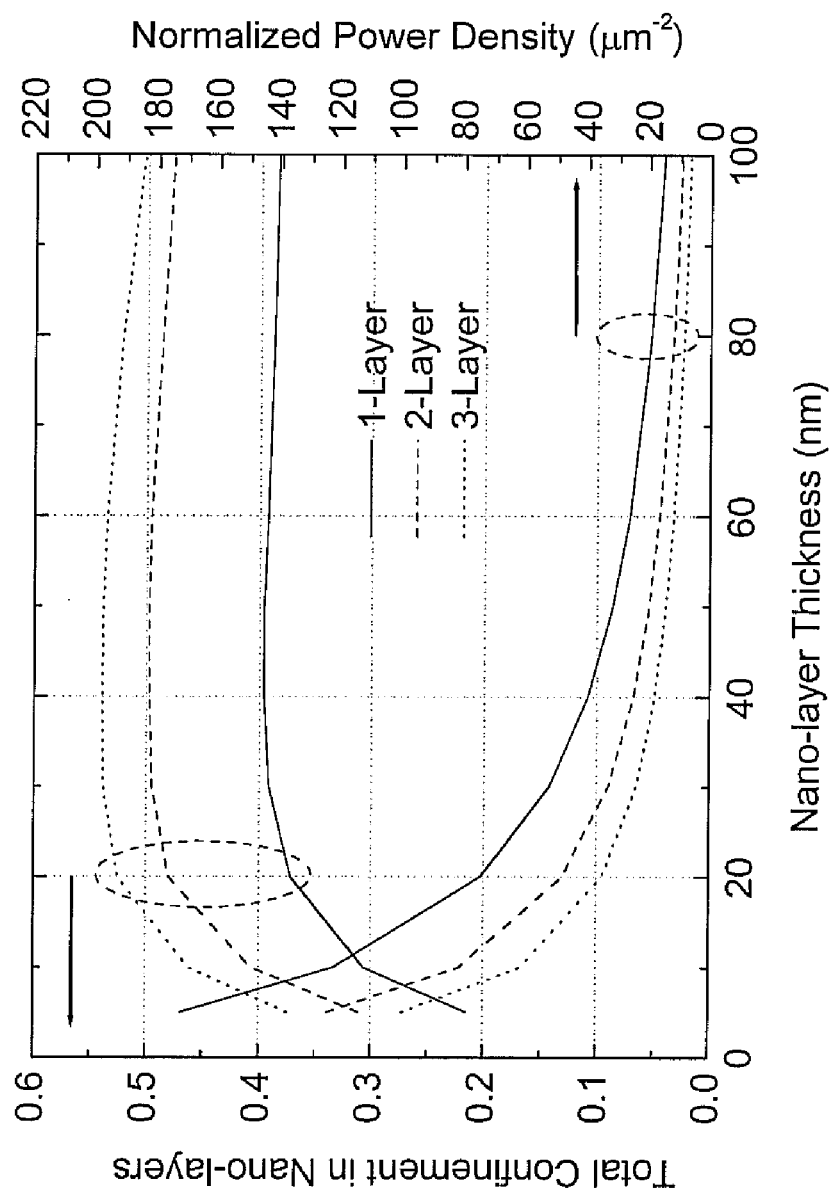
FIG. 7 is a graph demonstrating the total confinement factors and normalized power density as a function of the nano-layer thickness.

Secondly, the effects of the layer thicknesses have been studied. In FIG. 7, the total confinement factors as a function of the layer thickness are presented. The confinement factors for the multiple layered structures show a similar trend as the single layer case. They quickly reach their maximum values and decrease slowly with increasing layer thickness. Beyond the thickness range of 50 nm, the confinement factors almost remain constant. One can also show the averaged normalized power density, which is defined by the confinement factor divided by the total area of the nano-layer regions, in the same in FIG. 7. The power density drops quickly with increasing layer thickness. However, even for the 100 nm case, it can still maintain about 5-10 $\mu m^{-2}$, which is still larger than the normal SOI waveguides with a typical value about 1-5 $\mu m^{-2}$. In the thickness range less than 10 nm, the normalized power densities can be as large as 100 $\mu m^{-2}$ as we show in FIG. 6.

Figure 8:
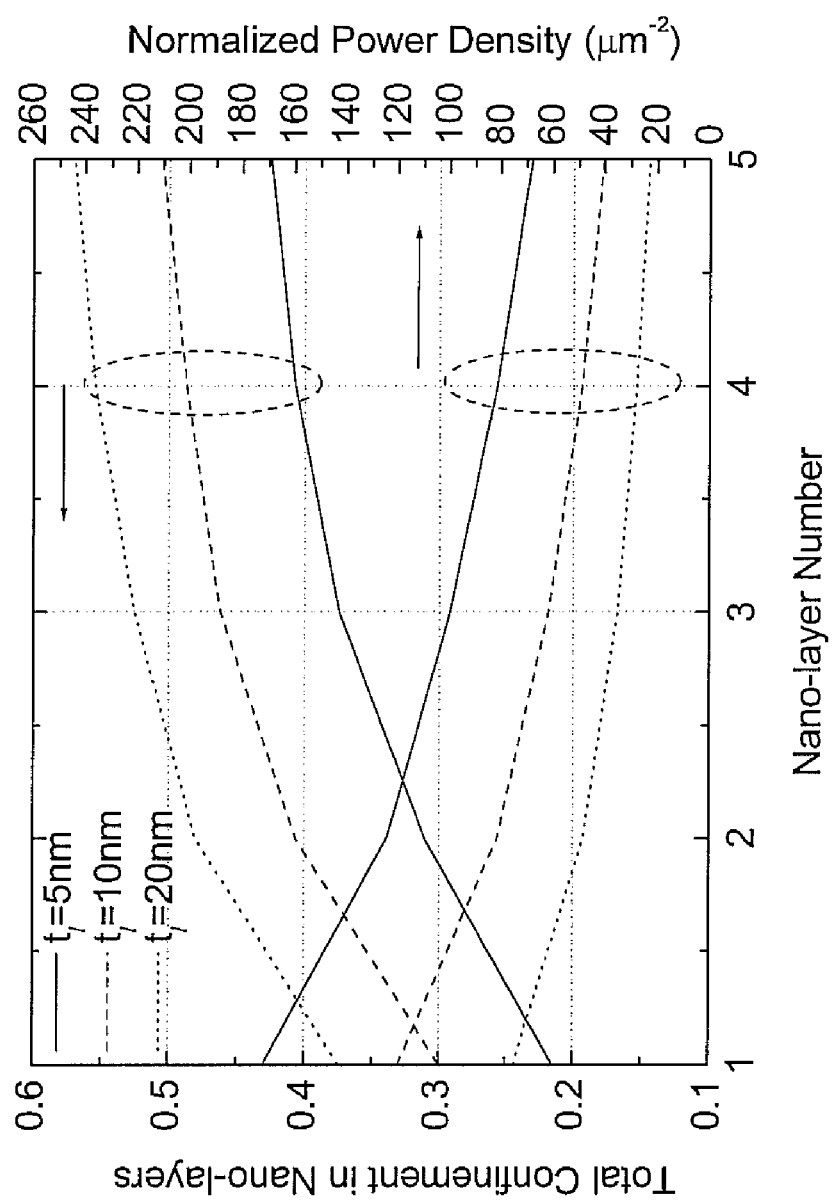
FIG. 8 is a graph demonstrating the total confinement factors and normalized power density versus nano-layer number.

The total confinement factors versus nano-layer number for several layer thicknesses are shown in FIG. 8. With a 4-layer configuration, total confinement factors of about 42% and 50% have been achieved for the 5 nm and 10 nm thick and 250 nm wide nano-layer waveguides, respectively. These values are twice as large as those of a single layer design. Also, it is noticed that increasing the layer number will not further improve the waveguide performance drastically after reaching a certain layer number. Therefore, the recommended layer number is 3-5. Furthermore, the normalized power density inside the nano-layer regions can reach 80 $\mu m^{-2}$ for the 4-layer 5 nm thin nano-layer configuration, which is one to two orders of magnitude larger than for normal SOI waveguides.

Figure 9:
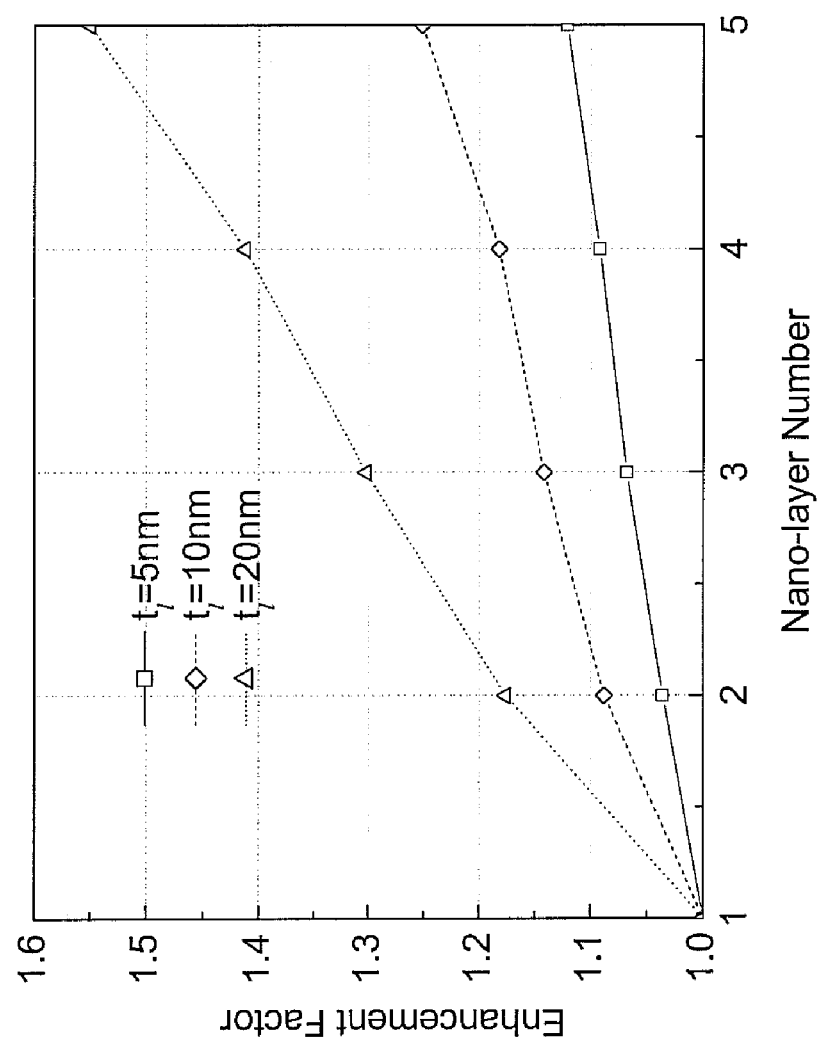
FIG. 9 is a graph demonstrating enhancement factors versus nano-layer number.

To demonstrate the advantage of the inventive structure over the original single layer design, one defines a parameter called enhancement factor $\eta$, $$\eta = \Gamma_{new}/\Gamma_{old}, \text{ subject to } S_{nano-layers} = \text{constant} \quad \text{Eq. 2}$$

where $\Gamma_{new}$ and $\Gamma_{old}$ represent the confinement factors for the new proposed multiplayer and the original single layer structures, and $S_{nano-layers}$ denotes the total area of the nano-layer region. The enhancement factors versus nano-layer number are plotted in FIG. 8. From FIG. 9, one can see that for 4-layer 5 nm layers, about 10% enhancement can be realized, and 20% for 10 nm nano-layers. By dividing the original single thick layer into multiple thin layers, both optical confinement and optical power density have been increased by the new structure.

Figure 10:
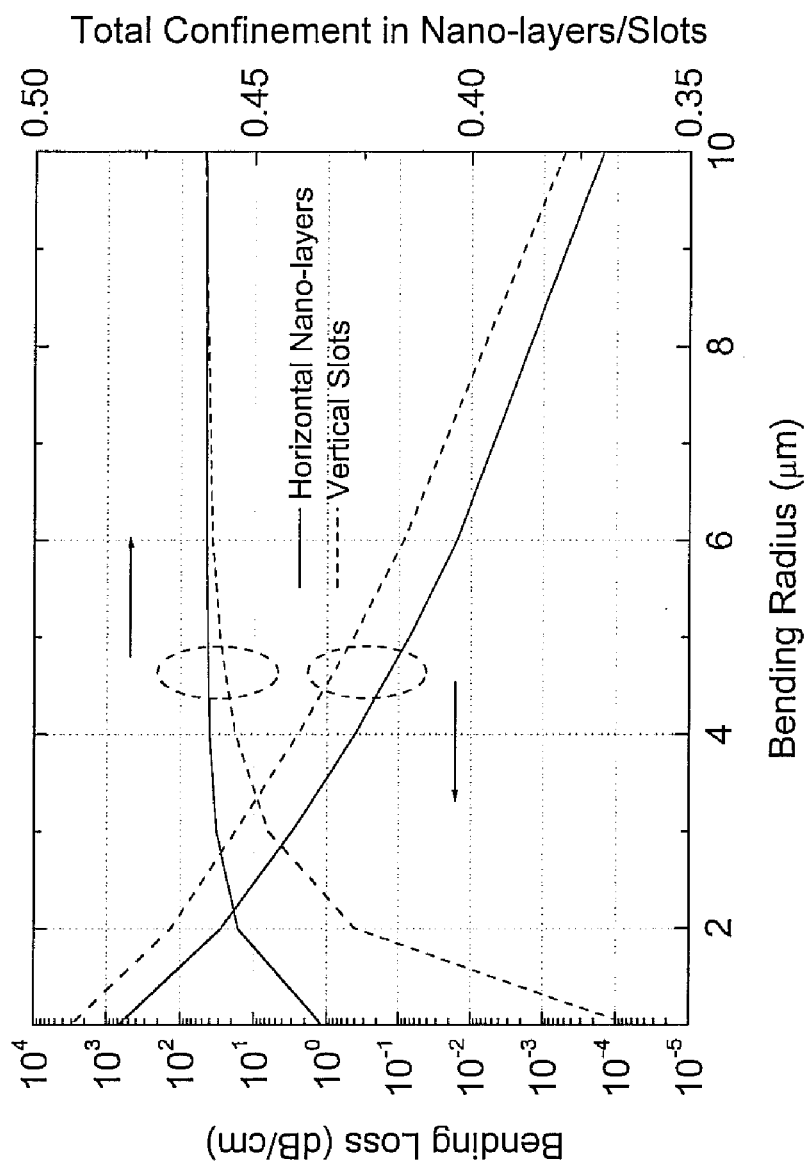
FIG. 10 is a graph demonstrating bending loss and confinement factor as a function of bending radius.

The bending characteristics are of great importance for the high-density photonic integration. In order to verify our argument that the horizontal nano-layers exhibit better bending characteristics than the vertical ones, we have done some comparison between these two configurations. FIG. 10 shows the bending loss and total confinement factor for the horizontal layer and vertical slot structures. According to the simulation, the bending loss for the horizontal nano-layers is about 5 times smaller than for the vertical slots.

Figure 11B:
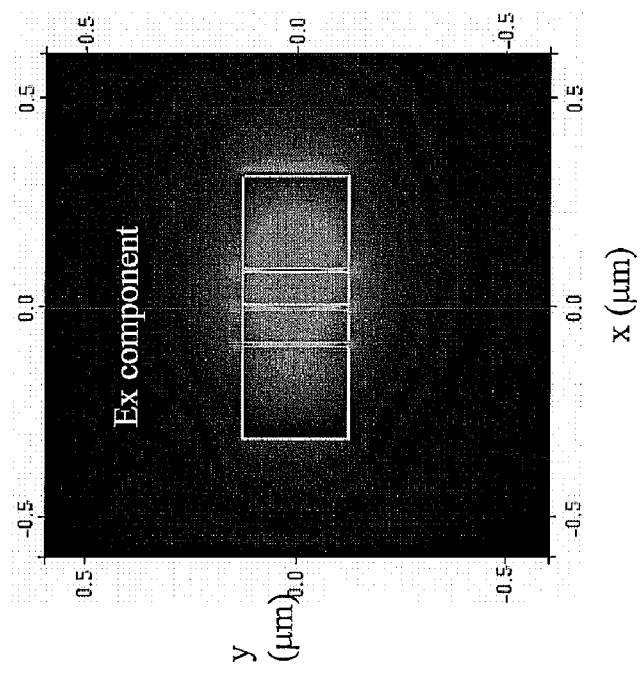
FIGS. 11A-11B are graphs demonstrating the field distributions of the major components of the horizontal layer and the vertical slot waveguide structures.
Figure 11A:
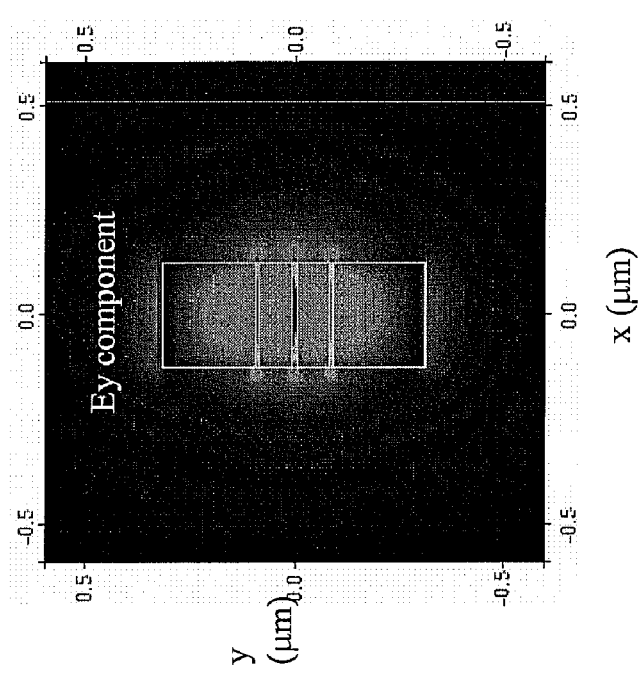

It can be verified by the field distributions of the major components for these two structures as shown in FIGS. 11A-11B, where the 3 $\mu m$ waveguide bends are simulated. As one can see, the horizontal structure shows little field shift even for such small bending radius as shown in FIG. 11A. On the contrary, obvious field shift has been observed for the vertical slot structure due to the long evanescent tail of the field in the cladding area as shown in FIG. 11B. Besides the lower bending loss, the horizontal layered structures also demonstrate much smaller performance degradation than the vertical slots. As one can see from FIG. 10, less than 4% confinement reduction has been observed for the horizontal structures with bending radius as small as 1 $\mu m$, which is 5 times smaller than that of the vertical slots.

The invention presents a multiple nano-layer optical field concentrator to realize a very high confinement factor and power concentration in nanometer size low-index media. The multiple nano-layer configuration proposed in this invention not only can confine and concentrate light in very thin nano-layers, but also complements the confinement reduction due to the reducing of layer thicknesses. According to simulation results, the new structure can provide 10%-40% confinement enhancement over the original single layer design.

With a 4-layer configuration, as high as 42% and 50% confinement factors have been achieved for 5 nm and 10 nm thick nano-layers in our optimal design. Furthermore, the horizontal arrangement of the nano-layers also demonstrated much better bending properties than the original vertical one. The presented invention can potentially be utilized in many silicon based optoelectronic devices.

Although the present invention has been shown and described with respect to several preferred embodiments thereof, various changes, omissions and additions to the form and detail thereof, may be made therein, without departing from the spirit and scope of the invention.

What is claimed is:

1. An optical field concentrator comprising:
   a plurality of waveguide layers comprising high index materials having a first defined thickness;
   at least one nano-layer structure that is positioned between said waveguide layers, said at least one nano-layer structure comprising low index materials having a second defined thickness that is smaller than said first defined thickness;
   a plurality of cladding layers that are positioned above and below said waveguide layers and said at least one nano-layer structure, said cladding layers having a third defined thickness that is larger than said first defined thickness; and
   a low index region surrounding said waveguide layers, said at least one nano-layer, and said cladding layers, said low index region having a defined index of at most 1.46.

2. The optical concentrator of claim 1, wherein said at least one nano-layer structure comprises an index of 1.5.

3. The optical concentrator of claim 2, wherein said waveguide layers comprise an index of 3.5.

4. The optical concentrator of claim 3, wherein said cladding layers comprise an index of 3.5.

5. The optical concentrator of claim 1, wherein said third defined thickness comprises a size of 200 nm.

6. The optical concentrator of claim 1, wherein said second defined thickness comprises a size of 80 nm.

7. The optical concentrator of claim 1, wherein said waveguide layers, said at least one nano-layer structure, and cladding layers are defined in a circular fiber.

8. A waveguide structure comprising:
   a plurality of waveguide layers comprising high index materials having a first defined thickness;
   at least one nano-layer structure that is positioned between said waveguide layers, said at least one nano-layer structure comprising low index materials having a second defined thickness that is smaller than said first defined thickness;
   a plurality of cladding layers that are positioned above and below said waveguide layers and said at least one nano-layer structure, said cladding layers having a third defined thickness that is larger than said first defined thickness; and
   a low index region surrounding said waveguide layers, said at least one nano-layer, and said cladding layers, said low index region having a defined index of at most 1.46.

9. The waveguide structure of claim 8, wherein said at least one nano-layer structure comprises an index of 1.5.

10. The waveguide structure of claim 9, wherein said waveguide layers comprise an index of 3.5.

11. The waveguide structure of claim 10, wherein said cladding layers comprise an index of 3.5.

12. The waveguide structure of claim 8, wherein said third defined thickness comprises a size of 200 nm.

13. The waveguide structure of claim 8, wherein said second defined thickness comprises a size of 80 nm.

14. The method of claim 8, wherein said third defined thickness comprises a size of 200 nm.

15. The waveguide structure of claim 8, wherein said wherein said waveguide layers, said at least one nano-layer structure, and cladding layers are defined in a circular fiber.

16. A method of forming an optical field concentrator comprising:
   forming a plurality of waveguide layers comprising high index materials having a first defined thickness;
   forming at least one nano-layer structure that is positioned between said waveguide layers, said at least one nano-layer structure comprising low index materials having a second defined thickness that is smaller than said first defined thickness;
   forming a plurality of cladding layers that are positioned above and below said waveguide layers and said at least one nano-layer structure, said cladding layers having a third defined thickness that is larger than said first defined thickness;
   forming a low index region surrounding said waveguide layers, said at least one nano-layer, and said cladding layers, said low index region having a defined index of at most 1.46.

17. The method of claim 16, wherein said at least one nano-layer structure comprises an index of 1.5.

18. The method of claim 17, wherein said waveguide layers comprise an index of 3.5.

19. The method of claim 18, wherein said cladding layers comprise an index of 3.5.

20. The method of claim 16, wherein said second defined thickness comprises a size of 80 nm.

21. The method of claim 16, wherein said wherein said waveguide layers, said at least one nano-layer structure, and cladding layers are defined in a circular fiber.

* * * * *